Oct. 12, 1965         P. J. BIZZIGOTTI         3,210,848

HANDPIECE OF THE AIR IMPULSE TURBINE TYPE

Filed Oct. 11, 1962

INVENTOR.
PIO J. BIZZIGOTTI
BY Arthur H. Serrell
ATTORNEY

# United States Patent Office 3,210,848
Patented Oct. 12, 1965

3,210,848
HANDPIECE OF THE AIR IMPULSE
TURBINE TYPE
Pio J. Bizzigotti, Huntington Station, N.Y., assignor to Sperry Rand Corporation, Great Neck, N.Y., a corporation of Delaware
Filed Oct. 11, 1962, Ser. No. 229,841
5 Claims. (Cl. 32—27)

This invention relates to a handpiece of the air impulse turbine type including a housing having a fitting part for attachment with a source of air supply through two inlet air lines. The rotor of the turbine drives a high speed dental or other drill when the housing is connected to the air source.

According to the present invention, the shaft of a suitable dental burr or drilling tool is axially connectable to the rotor of the impulse turbine part of the housing. The turbine rotor of the combination includes respective journal end portions that with a compartmented block provide a pair of air bearings of the axial thrust type which cooperate to axially position the rotor in relation to the housing. The bearing block provides a relatively frictionless mounting for the rotor in the handpiece that is free from vibration up to speeds of 200,000 r.p.m.

Independent inlet channels or passageways are provided in the improved handpiece for the respective bearings and impulse turbine. A single outlet channel or passageway is also included in the housing between a fitting part thereof connectable to a pneumatic line or hose and the respective turbine and bearing compartments thereof.

The primary object of the invention is to provide an attachment of the character described in which both the included impulse turbine and air bearings are operated by air supplied through separate inlet channels.

A further feature of the invention resides in the provision of an attachment of the type described in which the end journals of the turbine rotor are trunnions of conical configuration in relation to the axis. Another feature includes the provision in the handpiece of a manually adjustable valve in the independent air inlet passageway ahead of the turbine nozzle.

Further objects, features and structural details of the present invention will be apparent from the following description when read in relation to the accompanying drawing, wherein.

Figure 1:
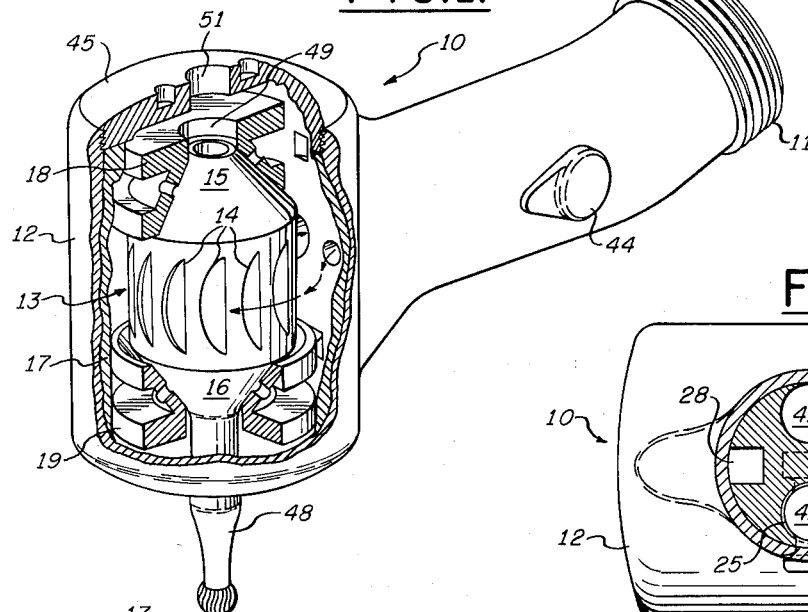
FIG. 1 is a perspective view with a cutaway part showing a handpiece constructed in accordance with the present inventive concepts in which a portion of the bearing structure is represented in cross section.
Figure 4:
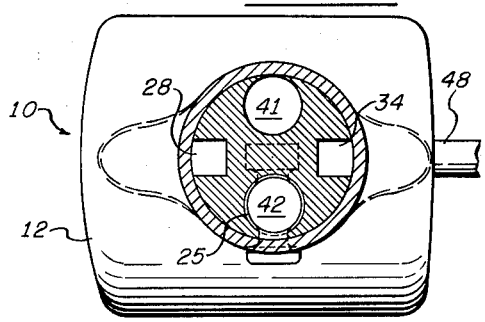
FIG. 4 is a cross sectional view taken on line 4—4 in FIG. 2.

The handpice 10 shown in the drawing includes a housing with a line or hose fitting part 11 of the threaded type. The air flow required to operate the attachment is obtained from a known high pressure source through a hose (not shown) with input and output channels connected to the handpiece fitting part 11.

Housing part 12 of the handpiece 10 houses a turbine of the impulse type having a rotor 13 with a cylindrical portion having peripheral buckets 14 and respective end journal portions 15 and 16, the axis of the turbine corresponding to the longitudinal axis of the rotor. The journals 15, 16 at the ends of the rotor 13 are trunnions of conical configuration in relation to the axis that tapers in a direction away from the buckets toward the axis.

The rotor 13 is mounted in part 12 of the handpiece by means of a bearing block consisting of a flanged sleeve 17 that axially spaces a bearing member 18 with a tapered surface conforming to the journal end portion 15 and a bearing member 19 with a tapered surface conforming to the journal end portion 16. In assembled relation, the sleeve 17 and members 18 and 19 include respective compartments 20 and 21 having air vents or ports 22 and 23. The compartmented block mounted on the handpiece together with the journal end portions of the rotor provide a pair of air bearings having opposed components of axial thrust. Under conditions where there is no applied axial load, the spinning rotor is supported between the spaced bearings in axial relation to the handpiece with the respective opposed thrust pressures in balance. The bearings provided accordingly permit the rotor some axial flexibility with a change in the thrust pressure relation to accommodate for applied axial loading.

The impulse turbine part of the handpiece further includes a nozzle 24 arranged therein tangentially with respect to the periphery of the central portion of the rotor. An air intake or inlet passageway or channel 25 is provided in the handpiece between the nozzle 24 and the fitting part 11. The directed air from the nozzle 24 passes through contiguous openings 26 and 27 in the part 12 and sleeve 17 to impinge upon the bucket and thereby spin the rotor about its axis.

Independent passageways or channels are also included in the handpiece for supplying pressurized air to the respective bearing compartments 20 and 21 under operating conditions. From the fitting part 11, this structure includes passageways 28 and 29, opening 30, compartment 31, and contiguous openings 32 and 33 in the part 12 and sleeve 17. The same connection provided for compartment 21 includes passageways 34, 35, opening 36, compartment 37 and contiguous openings 38 and 39 in the part 12 and sleeve 17. An output line connection for the bearings and turbine is included in the handpiece between the fitting part 11 and the chamber or part of the compartmented block provided between the spaced bearings. Here, outlet opening 40, FIG. 2, in sleeve 17 connects with an air exhaust passageway or channel 41 in the handpiece 10.

Figure 2:
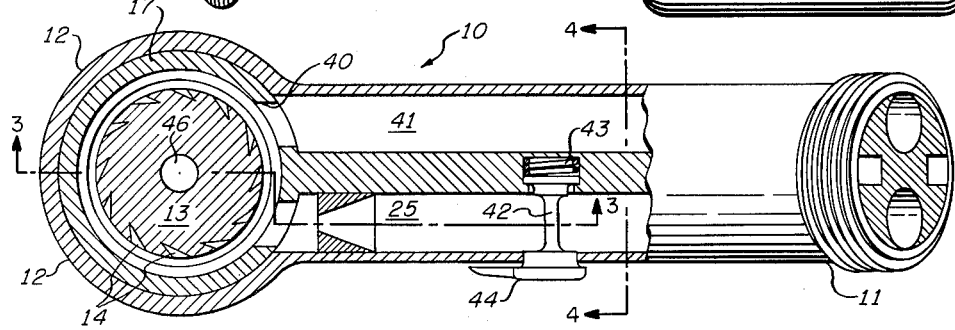
FIG. 2 is a horizontal cross sectional view of the handpiece shown in FIG. 1.
Figure 3:
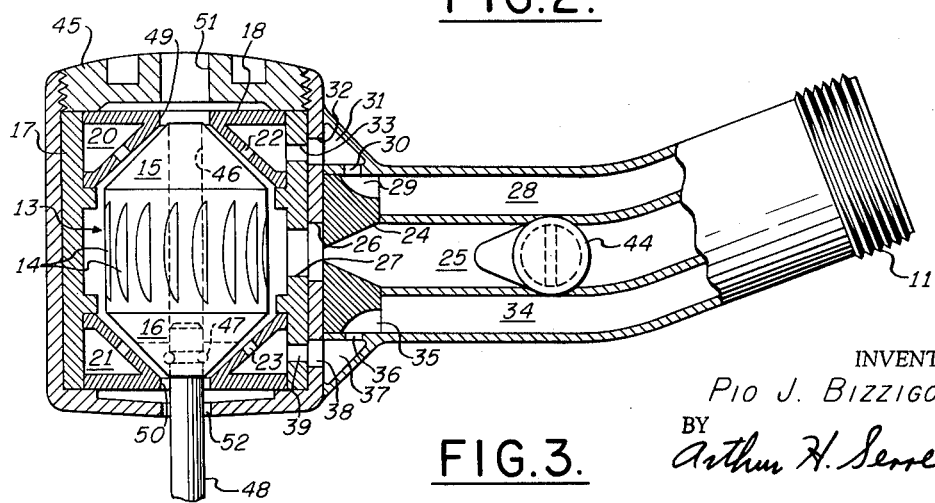
FIG. 3 is a cross sectional view taken on line 3—3 in FIG. 2.

As shown in FIG. 2, a manually operable valve 42 is located in the air inlet passageway or channel 25 to permit adjustment of the air flow through the nozzle 24 to the turbine and accordingly vary the speed of the rotor. Valve 42 is pivotally mounted in the handpiece 10 upstream of the nozzle and is biased to a closed condition by an internal spring 43. An external lever arm 44 fixed to the stem of the valve is operated manually to obtain the desired control of the turbine rotor speed. Valve 42 is located in passageway 25 between the fitting part 11 and the nozzle 24.

In the improved attachment, the compartmented block consisting of sleeve 17, bearing members 18, 19 and turbine rotor 13 provide an assembly that is removable as a unit from the handpiece 10 for replacement purposes. To facilitate removal, the handpiece part 12 includes a removable cover plate 45 that in connected position abuts one end of the sleeve 17 to fix the assembly in place in the handpiece housing. The assembly is freed for removal from the part 12 when the cover plate 45 is removed therefrom.

The rotor 13 includes an axial bore 46 with a fitting portion 47 for the shaft end of a dental burr or drilling tool 48. To permit access to the fitting portion 47 of the bore from both ends so that the tool may be readily removed from the rotor, both the bearing block and handpiece part 12 include respective pairs of spaced apertures respectively indicated at 49, 50 and 51, 52.

The rotor of the impulse turbine is conditioned for operation with supply of air pressure to the bearings when the fitting part 11 is connected to the air line. The lever 44 is then manually adjusted to open the valve to bring the rotor up to the desired spinning speed required for the drilling operation.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A handpiece of the air impulse turbine type including a housing having a fitting part for attachment with a source of air supply through two inlet air lines and an outlet air line; a turbine having a rotor with a cylindrical portion having peripheral buckets and respective end journal portions, a compartmented block in the housing providing a pair of air bearings with the respective end journal portions having opposed components of axial thrust along the longitudinal axis of the rotor, and a nozzle in the housing arranged tangentially with respect to the periphery of the cylindrical portion of the rotor; a channel in the housing for one of the inlet lines between the fitting part and the air bearings, a channel in the housing for the other of the inlet lines between the fitting part and the nozzle, a manually operable valve in the housing in the channel to the nozzle upstream of the nozzle, and a channel in the housing for the outlet air line between the air bearings and the fitting part.

2. A handpiec of the character claimed in claim 1 in which the cylindrical and end journal portions of the turbine rotor include an axial bore with a drill fitting portion, the end journal portions are trunnions of conical configuration in relation to the axis that taper in a direction away from the buckets towards the axis, and the bearing block and housing include apertures therein along the axis.

3. A handpiece of the air impulse turbine type including a housing having a fitting part for attachment with a source of air supply through two inlet air channels and an outlet air channel; a turbine having a rotor with a cylindrical portion with peripheral buckets and respective end trunnions, a compartmented block mounted in the housing providing a pair of air bearings with the respective trunnions having opposite components of axial thrust along the longitudinal axis of the rotor, and a nozzle arranged tangentially with respect to the periphery of the cylindrical portion of the rotor; a passageway in the housing for connecting the air bearings to one of the air inlet, channels a passageway in the housing for connecting the nozzle to the other of the air inlet channels, a manually adjustable valve in the nozzle passageway in the housing upstream of the nozzle, and a passageway in the housing for connecting the air bearings to the outlet channel.

4. A handpiece of the character claimed in claim 3, in which the cylindrical portion and trunnions of the turbine rotor include an axial bore with a drill fitting portion, the trunnions of the rotor have a conical configuration in relation to the axis that tapers in a direction away from the buckets towards the axis, and the bearing block and housing include apertures therein along the axis.

5. A handpiece of the air impulse turbine type including a housing having a fitting part for attachment with a source of air supply, a turbine having a rotor with a cylindrical part having peripheral buckets and respective end journal portions, a compartmented block in the housing providing a pair of air bearings with the respective journal end portions of the rotor having opposed components of axial thrust along the longitudinal axis of the rotor, and a nozzle arranged tangentially with respect to the periphery of the cylindrical part of the rotor; a first air channel in the housing between the fitting part and the nozzle having a manually adjustable valve therein, and a second air channel in the housing between the fitting part and the air bearings.

References Cited by the Examiner

UNITED STATES PATENTS 2,866,267 12/58 Fletcher et al.
2,945,299 7/60 Fritz.
3,088,707 5/63 Williams et al. _____ 253—2

RICHARD A. GAUDET, *Primary Examiner.*

ROBERT E. MORGAN, *Examiner.*